US012709045B2

(12) United States Patent
Boyer et al.

(10) Patent No.: US 12,709,045 B2
(45) Date of Patent: Aug. 18, 2026

(54) DEVICE, SYSTEM AND METHOD FOR CURING A TUBE LINER

(71) Applicant: Per Aarsleff A/S, Viby (DK)

(72) Inventors: Manfred Boyer, Viby (DK); Niklas Ernst, Stuttgart (DE); Esben Meyer, Viby (DK)

(73) Assignee: Per Aarsleff A/S (DK)

( * ) Notice: Subject to any disclaimer, the term of this patent is extended or adjusted under 35 U.S.C. 154(b) by 0 days.

(21) Appl. No.: 19/172,890

(22) Filed: Apr. 8, 2025

(65) Prior Publication Data

US 2025/0312948 A1 Oct. 9, 2025

(30) Foreign Application Priority Data

Apr. 9, 2024 (EP) .................................... 24169242

(51) Int. Cl.

*B29C 35/08* (2006.01)
*B29L 23/00* (2006.01)
*F16L 55/165* (2006.01)
*H05B 6/00* (2006.01)

(52) U.S. Cl.

CPC ...... *B29C 35/0805* (2013.01); *F16L 55/1656* (2013.01); *H05B 6/00* (2013.01); *B29C 2035/0827* (2013.01); *B29L 2023/22* (2013.01)

(58) Field of Classification Search

CPC ......... B29C 2035/0827; B29C 35/0805; B29L 2023/22; H05B 6/00; F16L 55/162; F16L 55/1656; F16L 55/18; F16L 55/26

See application file for complete search history.

(56) References Cited

U.S. PATENT DOCUMENTS

2020/0049301 A1 2/2020 Rasmussen
2025/0312948 A1* 10/2025 Boyer ................ B29C 35/0805

FOREIGN PATENT DOCUMENTS

| | | | |
|---|---|---|---|
| DK | 201870118 | A1 | 10/2018 |
| JP | 2016107424 | A | 6/2016 |
| WO | 2018127583 | A1 | 7/2018 |
| WO | 2020225401 | A1 | 11/2020 |

OTHER PUBLICATIONS

Opinion on KR119981042713.*
Extended European Search Report dated Aug. 26, 2024, from corresponding application EP24169242.5.
Office Action in corresponding Canadian patent application, CA3270114 Feb. 17, 2026.

* cited by examiner

*Primary Examiner* — Sonya M Sengupta
(74) *Attorney, Agent, or Firm* — McGarry Bair PC

(57) ABSTRACT

A device for curing a tube liner comprising: a curing assembly configured to cure at least a portion of the tube liner, and an optical heater configured to heat the portion of the tube liner at least before and/or after curing. The curing assembly comprises a first LED configured to emit electromagnetic radiation of a first wavelength. The optical heater comprises a second LED configured to emit electromagnetic radiation of a second wavelength, wherein the second wavelength is different from the first wavelength, and is within the spectrum of red light.

20 Claims, 3 Drawing Sheets

DEVICE, SYSTEM AND METHOD FOR CURING A TUBE LINER

CROSS-REFERENCE TO RELATED APPLICATIONS

This application claims the benefit of European Application No. 24169242.5, filed Apr. 9, 2024, which is incorporated by reference herein in its entirety.

TECHNICAL FIELD

The present invention relates to a device for curing a tube liner with light (CIPP=cured in place pipe). The present invention also relates to a system comprising said device and a method for curing a tube liner (CIPP) with said device.

SUMMARY

In the following, the term tube liner refers to CIPP.

Ultraviolet (UV) curing or light curing is a process used to repair pipes, such as underground pipes, by utilizing electromagnetic waves, preferably light or ultraviolet radiation, to cure specific liner materials including unsaturated reactive resins, such as styrene-comprising unsaturated polyester (UP) resins or styrene-free vinyl ester (VE) resins. During this process, a tube liner is pulled through or inverted into a damaged or leaking pipe and inflated so that the tube liner is pressed against the inner wall of the pipe. A curing device is then passed through the inflated tube liner to cure same. During the curing process, photo initiators in the resin convert the light or UV radiation into a chemical reaction that triggers polymerization and thus the curing of the resin.

In prior art curing devices, UV gas discharge lamps are used as light sources. Although they promote the polymerization process by emitting heat in the form of a broad spectrum of energy including significant amounts of infrared light (IR), they are energy-inefficient compared to modern light-emitting diodes (LEDs). Modern LEDs, on the other hand, only emit a moderate amount of heat.

Pre-heating or Post-Curing of resins supports a high grade of curing quality. Colder resins tend to react slower and less effective than warmer resins.

It would be preferable to provide a curing device which is energy efficient and at the same time promotes polymerization by delivering reliable heat transfer.

According to a first aspect, there is provided a device for curing a tube liner comprising a curing assembly configured to cure at least a portion of the tube liner, and an optical heater configured to heat the portion of the tube liner at least before and/or after curing. The curing assembly comprises at least a first LED configured to emit electromagnetic radiation of a first wavelength. The optical heater comprises at least a second LED configured to emit electromagnetic radiation of a second wavelength, wherein the second wavelength is different from the first wavelength, and is within the spectrum of yellow, orange and/or red light.

The term light refers to electromagnetic radiation in the visible spectrum of a typical human eye. The term visible or visible spectrum refers to wavelengths from 400 nm to 749 nm.

The term spectrum of red light refers to wavelengths from 610 nm to 749 nm.

The term spectrum of orange light refers to wavelengths from 590 nm to 610 nm.

The term spectrum of yellow light refers to wavelengths from 566 nm to 590 nm.

The emission of yellow, orange and/or red light from the second LED at least before, after and/or during curing with the first LED allows using the much more modern and energy-efficient LED diodes while promoting polymerization using thermal energy. In particular, the thermal energy generated by absorption of light from the second LED allows to reduce a residual proportion of monomer (residual styrene or residual methacrylate) that usually remains in the cured tube liner and which is harmful to the liner-lifetime and the environment. In addition, it turned out that the use of yellow, orange and/or particularly red light LEDs is advantageous compared to IR diodes, for example, because LEDs have been improved both in efficiency and durability over the last decade mainly in the visible spectrum of the light.

Curing a tube liner has a demand for maximum and highest energy transfer possible.

In industry applications development of powerful and high energetic LED diodes has been significantly driven by car and lighting industry. Such applications always only make use of visible light. This leads to the situation, diodes in the range of visible light (above 400 nm and below 750 nm) have highest development focus on power and efficiency, whereas diodes in invisible spectrum (UV and IR) so far are mainly used for medical applications or signal transfers. Both of the latter are classical low energy applications.

The term polymerization as used herein involves different polymerization techniques, such as polycondensation, polyaddition, radical, coordination, cationic, and anionic polymerizations.

The term "polymerization wavelength" as used herein refers to the specific wavelength or wavelength range of electromagnetic radiation that initiates or catalyzes a polymerization reaction in the tube liner.

Preferably the optical heater, when operated as a preheater, heats up the portion of the tube liner to a predefined preheating temperature above an ambient temperature. The term ambient temperature refers to a temperature inside the tube liner after it has been erected, preferably with compressed air provided from a compressor positioned on the earth surface or inside or on top of a building. After the portion of the tube liner has reached the predefined preheating temperature, the curing assembly emits light to said portion so to cure same. The curing operation is preferably performed at a predefined curing temperature, which is higher than the ambient temperature and preferably equal or higher than the preheating temperature. In some embodiments, the portion of the tube liner slightly cools down after preheating and before curing starts. The predefined preheating temperature and/or the curing temperature may be in the range from 5° C. to 100° C., preferably from 10° C. to 80° C., in particular from 20° C. to 50° C., higher than the ambient temperature. The ambient temperature may be in the range from von 5° C. to 30° C.

Thermally curing initiators may be added to the resin, in addition to those that react to electromagnetic radiation. These thermally curing initiators decompose upon heating, preferably at the pre-heating temperature and/or a post-curing temperature, generating free radicals that initiate the polymerization reaction in the resin. An example of a thermally curing initiator is a peroxide initiator, such as benzoyl peroxide or dicumyl peroxide.

Wavelengths

The second wavelength may be in the range from 590 nm to 749, preferably from 650 nm to 749 nm, more preferably from 650 nm to 720 nm, in particular from 650 nm to 700 nm.

The second wavelength may have a peak wavelength in the range from 675 to 699, preferably from 680 nm to 695 nm, in particular from 685 nm to 690 nm.

The first wavelength may be within the spectrum spanned by one or more of blue light and/or violet light and/or ultraviolet radiation.

The term spectrum of blue light refers to wavelengths from 450 nm to 499 nm.

The term spectrum of violet light refers to wavelengths from 400 nm to 449 nm.

The term spectrum of ultraviolet radiation refers to wavelengths from 100 nm to 399 nm, in examples from 100 nm to 340 nm.

The first wavelength may be in the range from 315 nm to 520 nm, preferably from 400 nm to 520 nm, more preferably from 420 nm to 490 nm, in particular from 410 nm to 490 nm.

In some examples, the first wavelength may be in the range from 410 nm to 490 nm. In other examples, the first wavelength may be in the range from 315 nm to 450 nm, preferably from 350 nm to 440 nm.

The peak wavelength of the first wavelength may be in the range from 440 nm to 460 nm, in particular at 450 nm. For example, the first wavelength may be in the range from 410 nm to 490 nm and the peak wavelength may be in the range from 440 nm to 460 nm, in particular at 450 nm.

Arrangement

A distance between the curing assembly and the optical heater may be selected based on at least one of a diameter of a pipe to be repaired, the first wavelength, and/or the second wavelength, so that the preheating temperature caused by the optical heater is maintained until curing is continued or triggered by the curing assembly.

The term pipe to be repaired as used herein refers to the pipe in which the tube liner is erected.

A distance between the curing assembly and the optical heater may be in a range from 5 cm to 200 cm, preferably from 50 cm to 120 cm, in particular from 70 cm to 100 cm for pipe diameters in a range from 100 mm to 700 mm, preferably from 150 mm to 550 mm.

As an example, a distance of 76 cm may be selected for a pipe diameter of 200 mm, preferably at a first wavelength of 450 nm. As another example, a distance of 95 cm may be selected for a pipe diameter of 500 mm, preferably at a first wavelength of 450 nm.

The optical heater may be arranged in front of the curing assembly in a guide movement direction.

The term guide movement direction refers to a movement direction of the device during preheating and/or curing operation. The guide movement direction may comprise a translational direction T and/or a rotational direction R.

The term translational direction T includes opposite directions along a translational axis. The translational axis preferably extends along the device' main axis, in particular, the main axis of the device' housing. Preferably, the main axis of the device corresponds to the main axis of the tube liner or extends parallel to it.

The term rotational direction R includes opposite directions along a circular line centered on the translational axis.

Housing

The device may further comprise a housing to protect at least a first LED and at least a second LED from the ingress of dust and/or water. The curing assembly and the optical heater may be arranged in the housing.

The housing may comprise a first housing portion and a second housing portion. The second housing portion and the first housing portion may be arranged in a distance, preferably in a distance in a translational direction from each other. The optical heater may be arranged in the second housing portion and the curing assembly may be arranged in the first housing portion.

Led Arrangement

The curing assembly and the optical heater or the first LEDs and the second LEDs may be alternately arranged in the housing along the translational direction T and/or the rotational direction R.

Guiding Device

The device may further comprise a guiding device having a guiding engine, in particular one or more electric motors, and a guiding line configured to cause, upon activation of the guiding engine, preferably with one or more gear boxes, a guide movement of the optical heater and the curing assembly relative to the tube liner in a translational direction T and/or to cause or allow a guide movement of the optical heater and the curing assembly relative to the tube liner in a rotational direction R, preferably around the translational direction T.

The guiding line may comprise or may be designed as a tube.

The guiding line, in particular the tube, may comprise a reinforcement structure, such as circumferential or helical reinforcement rings made of steel cord, to restrict torsion of the guiding line so to enable the caused guide movement of the optical heater and the curing assembly relative to the tube liner in a rotational direction R.

Alternatively, the guiding line may comprise a chain configured to be pulled through the tube liner by the guiding engine. The chain may be a steel chain.

Power Supply Device

The device may further comprise a power supply device having at least one power supply terminal and a power supply line configured to feed electric power from an energy source to the at least one power supply terminal. The at least one power supply terminal may be connected to the LEDs for powering same.

Multiple LEDS

The curing assembly and/or the optical heater may respectively comprise multiple LEDs which are connected to each other, preferably on a printed circuit board (PCB).

Sub-groups of LEDs of the curing assembly and/or the optical heater may be controlled interdependently from one another. The grouped control of the LEDs may enable a dimming functionality.

Temperature Sensor

The device may further comprise one or more temperature sensors configured to measure a temperature of the portion of the tube liner.

Cascade Control System

The device may further comprise a cascade control system including at least two interconnected control loops including an outer loop with a temperature controller and an inner loop with a speed controller.

Temperature Controller

The device further comprises a temperature controller, preferably a feedback temperature controller, configured to control a temperature of the portion of the tube liner, so that a reference temperature, in particular a predefined preheating temperature and/or curing temperature, is reached.

The temperature controller may be configured to set a reference speed of the optical heater and the curing assembly relative to the tube liner along a guide movement direction based on a difference between the reference temperature and a measured temperature of the portion of the tube liner, thereby changing a time period during which the portion of the tube liner is radiated by the optical heater.

The temperature controller comprises at least one of de- and activating or dimming the optical heater.

Speed Controller

The device further comprising a speed controller, preferably a feedback speed controller, configured to control a speed of the optical heater relative to the tube liner of the optical heater and the curing assembly relative to the tube liner along a guide movement direction.

The speed controller is configured to set an input of the guiding engine, preferably an input voltage, based on a difference between a reference speed and a measured speed of the optical heater and the curing assembly relative to the tube liner.

Communication Bus System

The device further comprising a communication bus system, wherein at least the first LED and the second LED are connected via the bus system.

The bus system comprises a local interconnect network (LIN) bus.

The one or more of the controllers, the guide engine and the temperature sensor are connected to the bus system System A system comprising the device according to one of the preceding embodiments, and a tube liner.

The tube liner comprises a resin composition including a photoinitiating system configured to initiate curing upon irradiation with the first wavelength.

The photoinitiating system may consist of or comprise a photoinitiator as such, or may be a combination of a photoinitiator and a sensitizer, or may be a mixture of photoinitiators, optionally in combination with one or more sensitizers.

The tube liner or, more specifically the resin composition of the tube liner, may comprise at least one or more of:

- unsaturated polyester (UP), preferably comprising or not comprising styrene, vinyl ester (VE), preferably comprising or not comprising styrene,
- acrylic resins,
- vinyl ester urethane (VEU), preferably comprising styrene,
- VE based on novolac and methacrylic acid and styrene, and/or
- epoxy (EP).

Method

A method for curing a tube liner with the device, the method comprising the steps of:

- curing a portion of the tube liner,
- heating the portion of the tube liner to a preheating temperature before curing or to a post-curing temperature after curing.

The Second Wavelength

The second wavelength of at least the second LED may be larger than a polymerization wavelength of the tube liner.

Examples will now be further described with reference to the figures. In these examples, the "optical heater" is described in an operation state acting as a "preheater".

However, one skilled in the art would understand that the optical heater can additionally or alternatively be used as a "post-curing heater" in other embodiments. For example, the optical heater can be used as post-curing heater in that the guide movement direction (e.g., the travel direction of curing device through the tube liner) is changed so that the optical heater reaches a portion of the tube liner after the curing assembly has reached or cured this portion. In other examples, the first (curing) LEDs are turned on before the second (heating) LEDs are turned on.

In other examples, the device for curing the tube liner may include two or more optical heaters with an intermediate curing assembly, so that one of the optical heaters forms a preheater and the other one a post-curing heater.

In some examples, multiple optical heaters and one or more curing assemblies and/or first LEDs and second LEDs may be alternately arranged along the guide movement direction. In other examples, there may be at least two or more optical heaters and/or second LEDs arranged subsequently before and/or after one or more curing assemblies or one or more first LEDs, respectively. In other examples, there may be at least two or more curing assemblies and/or first LEDs arranged subsequently before and/or after one or more optical heaters or one or more second LEDs, respectively.

DETAILED DESCRIPTION

Figure 1:
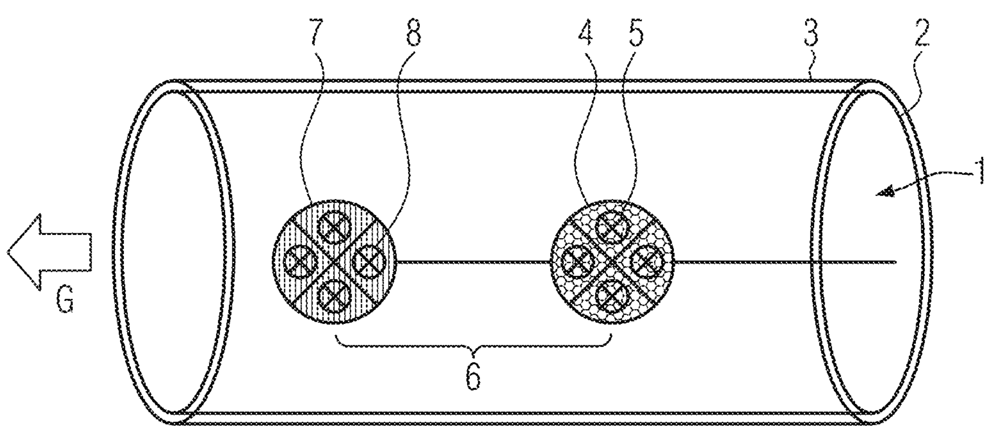
FIG. 1 shows a schematic perspective view of a device for curing a tube liner according to an embodiment of the invention arranged within an underground pipe to repair same.

FIG. 1 shows a device 1 for curing a tube liner 2. The tube liner 2 is arranged and is blown up to contact a damaged underground pipe 3. The device 1 comprises a curing assembly 4 having a plurality of first LEDs 5. The first LEDs 5 are configured to emit blue light, violet light and/or ultraviolet rays to cure the tube liner 2, in particular a portion of the tube liner 2 that is radiated with the blue and/or violet light.

In a distance 6 along a guide movement direction G of the curing assembly 4, there is a preheater 7 for pre-heating the portion of the tube liner 2 before it is cured. The preheater 7 includes second LEDs 8. The second LEDs 8 emit light in a wavelength range of or within the spectrum of yellow (566 nm to 590 nm), orange (590 nm to 610 nm) and/or red light (610 nm to 749 nm).

Throughout the Figures, electromagnetic radiation of a first wavelength emitted by the first LEDs 5 (i.e., blue light, violet light and/or ultraviolet rays) is symbolized by a hexagon pattern. Electromagnetic radiation of a second wavelength emitted by the second LEDs 8 (i.e., yellow, orange, and/or red light) is symbolized by parallel lines.

Figure 2:
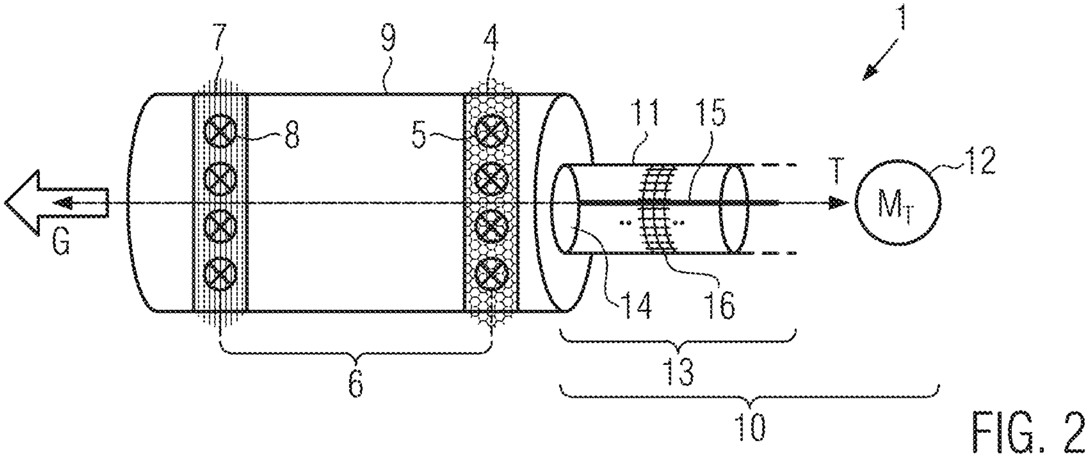
FIG. 2 shows a schematic perspective view of a first embodiment of a housing and a first embodiment of a guiding device that may be used in the embodiment of the device according to FIG. 1.

FIG. 2 shows a schematic perspective view of a first embodiment of a housing 9 and a first embodiment of a guiding device 10 for the device 1. The housing 9 has preferably a cylindrical shape with its main axis concentric to the tube liner 2. In other examples, the housing 9 has a rectangular shape or any other suitable shape. The housing 9 accommodates the preheater 7 and the curing assembly 4. In the following the term "curing head" may be used to refer to an assembly of the housing 9, preheater 7 and curing assembly 4.

The guiding device 10 includes a guiding line 11 and a guiding engine 12 positioned on the earth surface. The guiding engine 12 in the present embodiment comprises an electric motor and a gearbox for converting the rotational movement of the motor in a movement along the translational direction T. The guiding line 11 is arranged between the curing head and the guide engine 12 and is configured to cause upon activation of the guiding engine 12 a guide movement G of the curing head relative to the tube liner 2 in a transitional direction T. In the present embodiment, the curing head is "pushed" by guiding device 10 in the a guide movement direction G.

As further shown in FIG. 2, the device comprises a power supply device 13. The power supply device 13 comprises a power supply terminal 14 for engaging with a mating terminal on the housing 9 and a power supply line 15 arranged inside the guiding line 11, which, in the present embodiment is designed as a tube with a reinforcement structure 16. The power supply terminal 14 provides a power interface between the power supply line 15 and the curing head, particularly the first (blue/violet/ultraviolet) LEDs 5 and/or the second (yellow, orange and/or red) LEDs 8. In the present embodiment the distance 6 between the preheater 7 and the curing assembly 4 is a translational distance.

Figure 3:
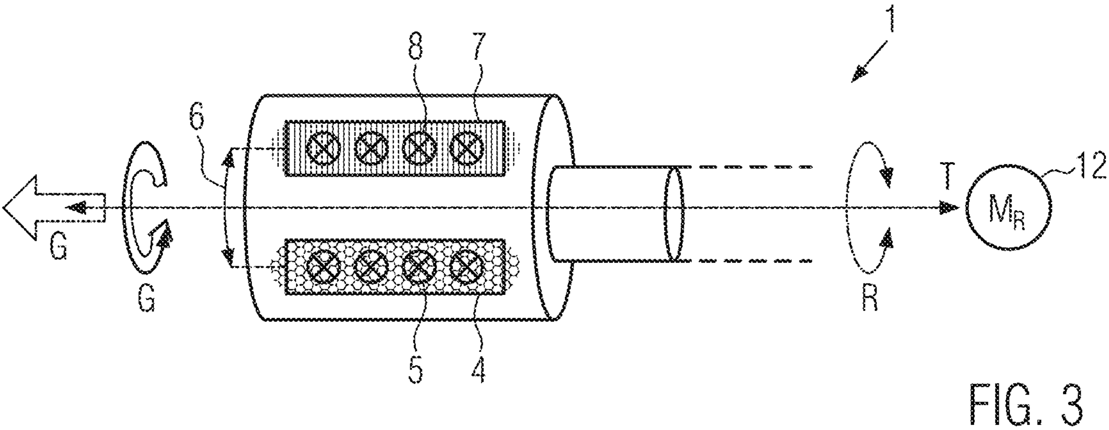
FIG. 3 shows a schematic perspective view of a first embodiment of a housing and a second embodiment of a guiding device that may be used in the embodiment of the device according to FIG. 1.

FIG. 3 shows another embodiment of a device 1. In contrast to the embodiment shown in FIG. 2, the guide movement direction G is along a rotational direction R around the curing head' main axis (translational direction T). In this embodiment, the distance 6 between the preheater 7 and the curing assembly 4 is an angular displacement. After a portion of the tube liner 2 has been cured, the curing head is moved along the translational direction T to a next position, where the curing head is again is rotated to achieve curing. In some examples, the guide movement direction G can be in both, along the translational direction T and the rotational direction R at the same time.

Figure 4:
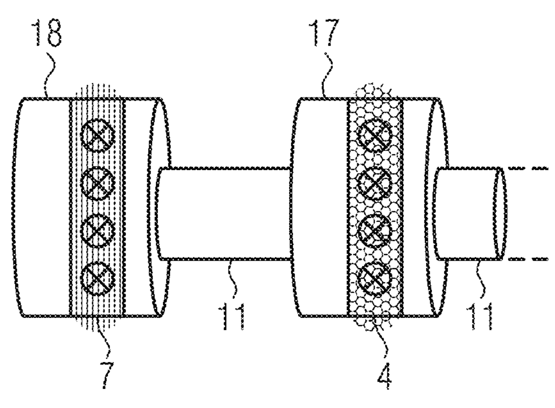
FIG. 4 shows a schematic perspective view of a second embodiment of a housing that may be used with the first and/or second embodiment of the guiding device shown in FIGS. 2 and 3, respectively.

FIG. 4 shows a second embodiment of a housing 9 where the housing portion is divided in two housing portions, namely a first housing portion 17 and a second housing portion 18. The first housing portion 17 accommodates the curing assembly 4. The second housing portion 18 accommodates the preheater 7. The first housing portion 17 and the second housing portion 18 are connected to each other via a guiding line 11.

Figure 5:
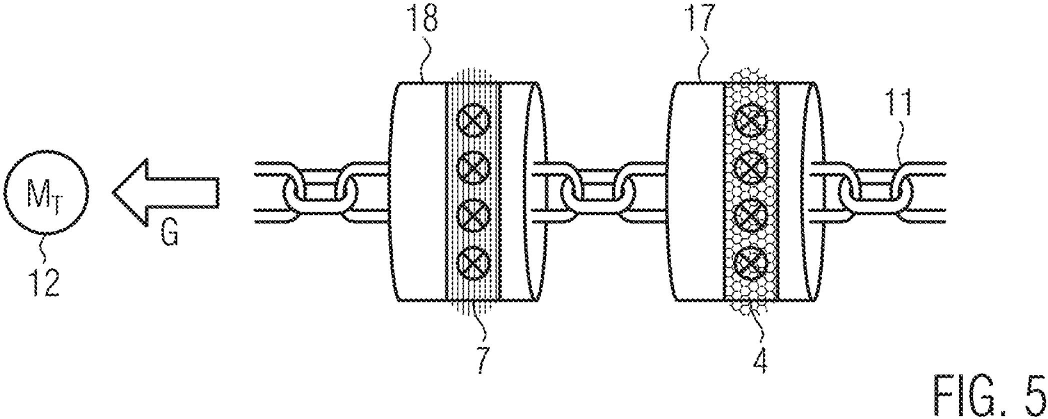
FIG. 5 shows a schematic perspective view of a second embodiment of a housing and a third embodiment of a guiding device that may be used in the embodiment of the device according to FIG. 1.

FIG. 5 shows a schematic perspective view of another embodiment of the device 1 where in contrast to the embodiments shown in FIGS. 1 to 4, a chain is used as a guiding line 11. A guiding engine 12 is provided in the guiding movement direction G so to "pull" the curing head through the tube liner 2.

Figure 6:
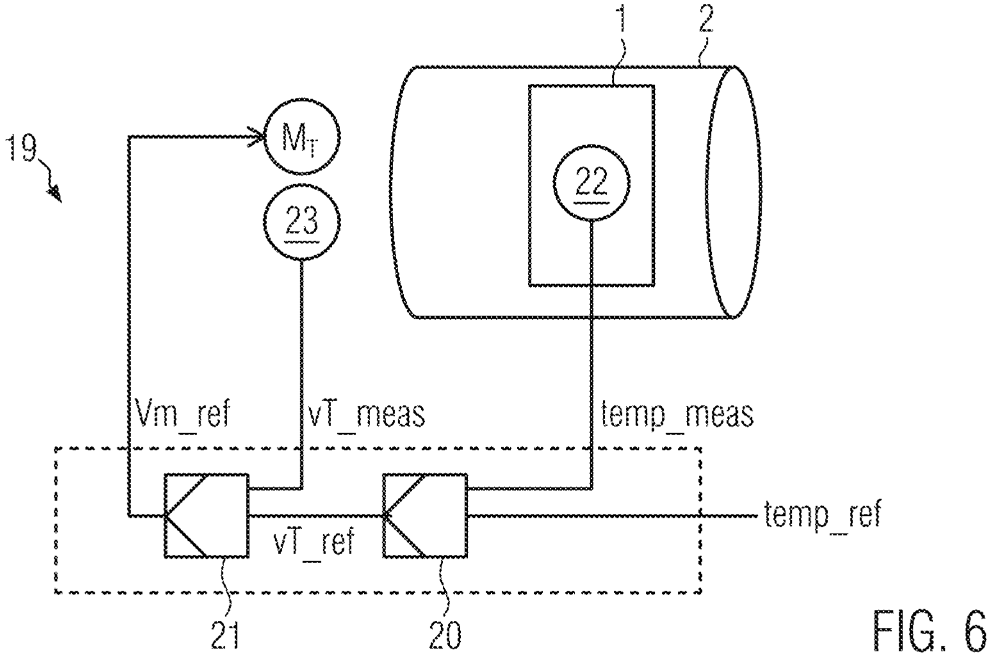
FIG. 6 shows a schematic view of a cascade control system including at least two interconnected control loops including an outer loop with a temperature controller and an inner loop with a speed controller that may be used in the embodiment of the device according to FIG. 1.

FIG. 6 shows a schematic view of a cascade control system 19 of the device 1. The cascade control system 19 includes at least two interconnected control loops including an outer loop with a temperature controller 20 and an inner loop with a speed controller 21. The temperature controller 20 is configured to control a temperature of a portion of the tube liner 2, so that a reference temperature temp_ref (preheating temperature or curing temperature) is reached. The temperature controller 20 is configured to set a reference speed, in the present embodiment, a translational reference speed vT_ref of the curing head relative to the tube liner 2 based on a difference between reference temperature temp_ref and a measured temperature temp_meas provided by a temperature sensor 22. By changing the reference speed vT_ref of the curing head, a time period during which a portion of the tube liner 2 is radiated by the preheater or curing assembly can be changed. Additionally or alternatively, in some examples, the temperature is controlled by dimming the second LEDs 8. The speed controller 21 receives the translational reference speed vT_ref from the temperature controller 20 and compares same to a measured translational speed vT_meas provided by a speedometer 23. Based on a difference between those two signals, the speed controller 21 sets an input of the guiding engine 12, in particular an input voltage so to change its speed.

Figure 7:
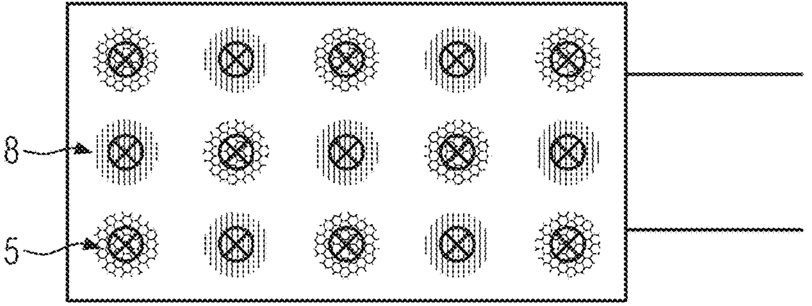
FIG. 7 shows a schematic perspective view of an LED arrangement that may be used in any of the embodiment of the device according to FIGS. 1 to 5.

FIG. 7 shows a schematic perspective view of a mixed LED arrangement used in the curing head. In this embodiment, multiple first (blue/violet/ultraviolet) LEDs 5 and multiple second (yellow, orange and/or red) LEDs 8 are arranged alternately along the translational direction T and rotational direction R. During use, the curing head is guided to a curing position, at which the second LEDs 8 are turned on for preheating a portion of the tube liner and afterwards (immediately afterwards or with a time shift) the first LEDs 5 for curing the portion of the tube liner are turn on. Afterwards, the curing head is moved to a next position and the preheating/curing steps are repeated.

Figure 8:
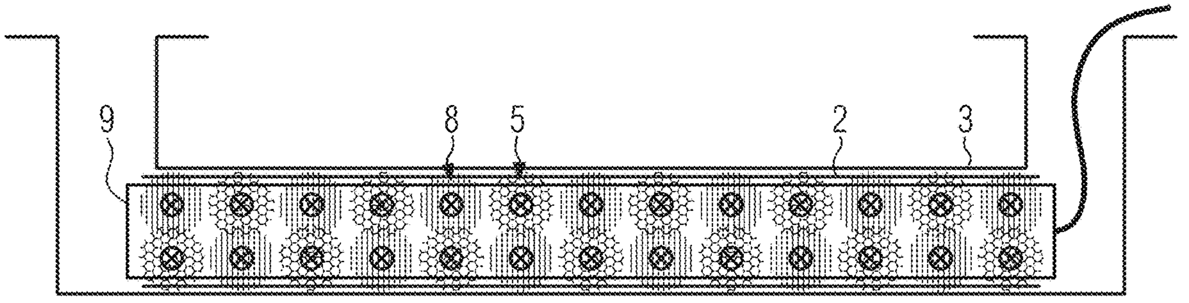
FIG. 8 shows a schematic side view of a third embodiment of a housing having the LED arrangement according to FIG. 7 that may be used in the embodiment of the device according to FIG. 1.

FIG. 8 shows the same mixed LED arrangement as in FIG. 7. In contrast to FIG. 7, the curing head extends over the entire length of the tube liner 2. The use of such a curing head enables the entire tube liner 2 to be preheated and cured without moving the curing head through the tube liner 2. In other examples, the curing head extends over the entire length of the underground pipe 3.

What is claimed is:

1. A device for curing a tube liner comprising:

a curing assembly configured to cure at least a portion of the tube liner, and an optical heater configured to heat the portion of the tube liner at least before and/or after curing, wherein the curing assembly comprises at least a first LED configured to emit electromagnetic radiation of a first wavelength, wherein the optical heater comprises at least a second LED configured to emit electromagnetic radiation of a second wavelength, wherein the first wavelength is different from the second wavelength, and wherein the second wavelength is within a spectrum of yellow, orange and/or red light, and wherein the first wavelength is in a range from 315 nm to 520 nm.

2. The device according to claim 1, wherein the second wavelength is in a range from 590 nm to 749 nm.

3. The device according to claim 1, wherein the second wavelength is in a range from 650 nm to 720 nm.

4. The device according to claim 1, wherein the second wavelength is in a range from 650 nm to 700 nm.

5. The device according to claim 1, wherein the first wavelength is within a spectrum spanned by one or more of blue light and/or violet light and/or ultraviolet radiation.

6. The device according to claim 5, wherein the first wavelength is in a range from 400 nm to 520 nm.

7. The device according to claim 5, wherein the first wavelength is in a range from 410 nm to 490 nm.

8. The device according to claim 1, wherein a distance between the curing assembly and the optical heater is selected based on at least one of a diameter of a pipe to be repaired, the first wavelength, and/or the second wavelength, so that a preheating temperature caused by the optical heater is maintained until curing is continued or triggered by the curing assembly.

9. The device according to claim 1, wherein the optical heater is arranged in front of or after the curing assembly in a guide movement direction.

10. The device according to claim 1, comprising a housing to protect the first LED and the second LED from the ingress of dust and/or water, wherein the curing assembly and the optical heater are arranged in the housing.

11. The device according to claim 10, wherein the housing comprises a first housing portion and a second housing portion, wherein the second housing portion and the first housing portion are arranged in a distance from each other, and wherein the optical heater is arranged in the second housing portion and the curing assembly is arranged in the first housing portion.

12. The device according to claim 1, comprising a guiding device having a guiding engine including one or more electric motors, and a guiding line configured to cause, upon activation of the guiding engine, a guide movement of the optical heater and the curing assembly relative to the tube liner in a translational direction and/or to cause or allow a guide movement of the optical heater and the curing assembly relative to the tube liner in a rotational direction around the translational direction.

13. The device according to claim 1, comprising a feedback temperature controller configured to control a temperature of the portion of the tube liner, so that a reference temperature, including a predefined preheating temperature, post-curing temperature, and/or curing temperature, is reached.

14. The device according to claim 13, wherein the feedback temperature controller is configured to set a reference speed of the optical heater and the curing assembly relative to the tube liner along a guide movement direction based on a difference between the reference temperature, and a measured temperature of the portion of the tube liner, thereby changing a time period during which the portion of the tube liner is radiated by the optical heater.

15. The device according to claim 13, wherein the feedback temperature controller comprises at least one of deactivating and activating or dimming the optical heater.

16. The device according to claim 1, comprising a feedback speed controller configured to control a speed of the optical heater and the curing assembly relative to the tube liner along a guide movement direction.

17. A system comprising the device according to claim 1, and a tube liner.

18. The system according to claim 17, wherein the second wavelength of at least the second LED is larger than a polymerization wavelength of the tube liner.

19. A method for curing a tube liner with the device according to claim 1, the method comprising the steps of:

curing a portion of the tube liner, and heating the portion of the tube liner to a preheating temperature before curing or to a post-curing temperature after curing.

20. The method according to claim 19, wherein the second wavelength of at least the second LED is larger than a polymerization wavelength of the tube liner.

* * * * *